United States Patent [19]

Clayton et al.

[11] Patent Number: 4,492,948

[45] Date of Patent: Jan. 8, 1985

[54] FAST RESPONSE SURFACE CONTACT TEMPERATURE SENSOR

[75] Inventors: Wilson A. Clayton, LaHabra; Alexander Galperin, Fullerton, both of Calif.

[73] Assignee: Leeds & Northrup Company, North Wales, Pa.

[21] Appl. No.: 298,681

[22] Filed: Sep. 2, 1981

[51] Int. Cl.³ .............................................. H01C 3/04
[52] U.S. Cl. ..................... 338/25; 338/22 R; 338/28; 374/185
[58] Field of Search ................. 338/22 R, 22 SD, 25, 338/28, 30; 374/138, 148, 183, 185, 208, 209, 144, 145

[56] References Cited

U.S. PATENT DOCUMENTS

| | | | |
|---|---|---|---|
| 2,484,585 | 12/1949 | Quinn | 338/25 |
| 2,606,986 | 8/1952 | Sweger | 338/25 |
| 2,818,482 | 12/1957 | Bennett | 201/63 |
| 2,961,625 | 11/1960 | Sion | 338/28 |
| 3,681,990 | 8/1972 | Barrett et al. | 73/343 R |
| 3,721,001 | 3/1973 | Crosby et al. | 29/612 |
| 3,832,669 | 8/1974 | Mueller et al. | 338/28 |
| 3,845,443 | 10/1974 | Fisher | 338/28 X |
| 3,886,798 | 6/1975 | Fortune | 73/343 R |
| 3,919,680 | 11/1975 | Ueno et al. | 338/25 X |
| 4,321,827 | 3/1982 | Anderson | 374/165 X |

Primary Examiner—C. L. Albritton
Attorney, Agent, or Firm—Harold Huberfeld; Raymond F. MacKay

[57] ABSTRACT

A high speed, high accuracy surface temperature measuring probe of the contact type including a thin-film platinum resistance thermometer mounted in a support assembly having a low specific heat and low conductivity with a thin pure copper end cap in thermal contact with the resistance thermometer and extending along the sidewalls of the probe for a short distance.

10 Claims, 6 Drawing Figures

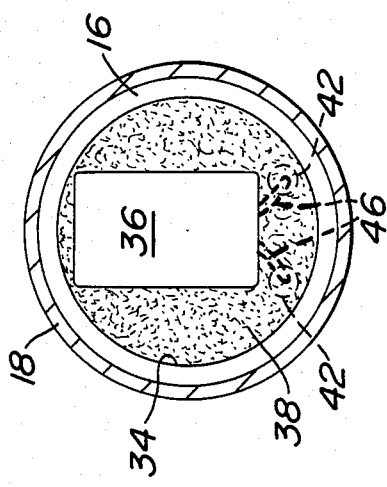
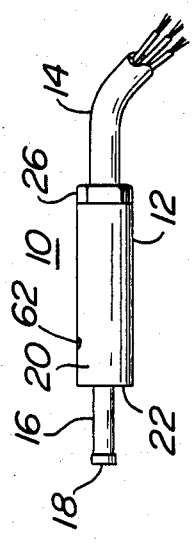
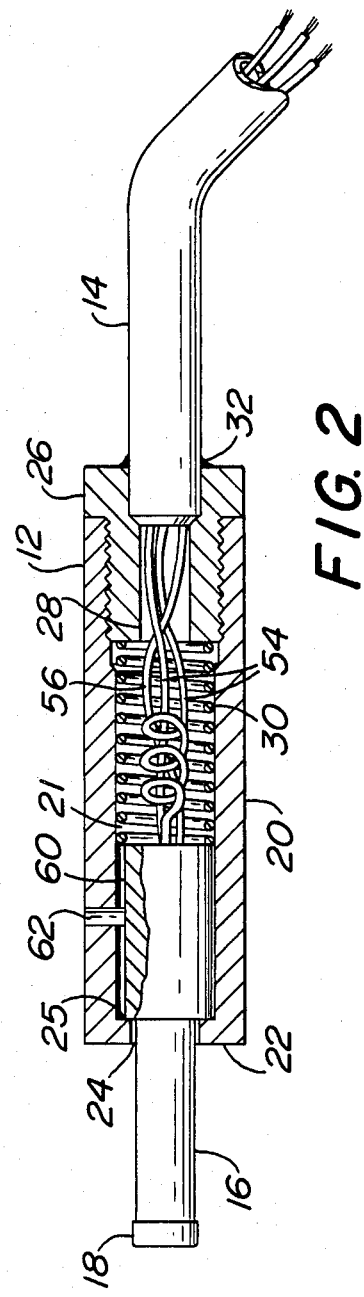
FIG. 4
FIG. 1
FIG. 2

FAST RESPONSE SURFACE CONTACT TEMPERATURE SENSOR

BACKGROUND OF THE INVENTION

This invention relates to surface temperature measuring devices and more particularly to surface temperature measuring devices that are placed in contact with the surface whose temperature is to be measured.

In the measurement of the temperature of a surface by devices placed in contact with the surface, it is of utmost importance in order to obtain an accurate temperature measurement that the measuring probe not influence to any significant extent the thermal conditions existing in the surface. It is also, of course, desirable in most applications that the temperature measuring probe respond rapidly to the temperature of the surface. In some instances these measuring probe characteristics have been accomplished by including within the surface temperature measuring probe a heater so that the tip of the probe in contact with the surface is brought closer to the temperature of the surface being measured to reduce or eliminate heat loss from the surface by virtue of contact by the measuring probe. Typical examples of such surface temperature measuring probes utilizing measuring thermocouples are shown in U.S. Pat. No. 3,321,974 Sterbutzel and U.S. Pat. No. 3,834,237 Robertson. While such surface measurement probes reduce the heat drawn from the surface being measured and create an isothermal condition between the probe and the surface, there may be distortion in the thermal conditions of the surface whose temperature is to be measured because the normal heat loss from the surface due to radiation, convection, and conduction to the ambient conditions of the environment are essentially eliminated.

It is an object of this invention to produce a high speed, high accuracy surface temperature measuring probe having the characteristic that when placed in contact with the surface whose temperature is to be measured does not significantly alter the heat loss or heat transfer coefficient from the measured surface. This and other objects of the invention will be apparent from the following description.

BRIEF DESCRIPTION OF THE DRAWINGS

FIG. 1 is an elevation view of a fast response surface contact temperature probe;

FIG. 2 is an elevation view in partial cross-section of the probe;

FIG. 4 is a cross-section of the measuring end of the probe;

DESCRIPTION OF THE PREFERRED EMBODIMENT

Figure 3:
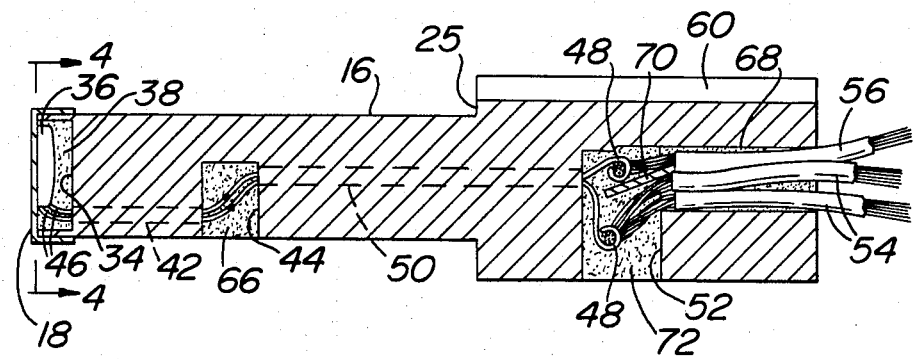
FIG. 3 is a sectional view of the sensor supporting assembly of the probe.

FIG. 1 shows the general appearance of a high speed, high accuracy surface temperature measuring probe 10 comprising a handle portion 12, a handle extension 14, a sensor support assembly 16 having a portion thereof telescoped within the handle portion 12 and having an end cap 18.

The internal configuration of the handle portion 12 is more fully disclosed in FIG. 2. As shown, the handle portion 12 is comprised of a cylindrical body section 20 having an internal cavity 21 closed at one end by an end wall 22 having an opening 24 therein. Telescopically mounted in the cavity 21 is one end portion of the support assembly 16. As shown, one end of the support assembly 16 has a reduced diameter that passes through the opening 24 in the end wall 22. The other end of the support assembly 16 has an enlarged diameter that is greater than the opening 24 and producing a shoulder 25 in the outer wall surface of the support assembly 16. The shoulder 25 engages the end wall 22 and prevents the support assembly 16 from passing completely through the opening 24. The opposite end of cavity 21 has an internal thread and is closed by a threaded plug 26 having a hole 28 therethrough. A compression spring 30 located within the cavity 21 between the end of the support assembly 16 and the plug 26 applies a force to the support assembly 16 in a direction to urge the shoulder 25 into contact with the end wall 22. The handle extension 14 may be secured to the plug 26 as by a braze at 32.

The sensor support assembly 16 shown in section in FIG. 3 includes at its distal end a recessed chamber 34 in which a temperature sensing element shown as a thin-film resistance thermometer 36 is mounted in a phosphate bonded alumina high temperature cement 38. In a preferred embodiment the resistance thermometer is made of platinum. In the manufacture of the probe 10, the thin-film resistance thermometer 36 is mounted in the recessed chamber 34 and secured by the cement 38 with the flat side of the resistance thermometer 36 facing outwardly. The end of the support assembly 16 is then preferably lightly ground to insure that the exposed surface of the resistance thermometer 36 is in the plane of the end of the support assembly 16.

Secured to the end of the support assembly 16 is a thin metal cap 18 in intimate thermal contact with the exposed surface of the resistance thermometer 36. In a preferred embodiment of this invention, the metal cap 18 is made of pure copper of a thickness of three mils. By selecting pure copper as the material for the cap 18, a high thermal conductivity for the cap 18 is obtained for rapid flow of heat from the measured surface to the resistance thermometer 36 to provide for high speed of response of the resistance thermometer 36 to the temperature of the surface to be measured. Pure copper additionally has the advantage that it is easily deformable so that the surface of the cap 18 will, during measurement, be deformed to fill all micro-roughness in the surface whose temperature is to be measured.

While the cap 18 must have a high thermal conductivity to provide for rapid response of the resistance thermometer 36 to the temperature of a surface, it is also important that the sensor support assembly 16 have a low heat capacity and low thermal conductivity. In order to achieve these characteristics in a preferred embodiment of the invention, the sensor support assembly 16 was made of MACOR ®, a machinable glass ceramic sold by Corning Glass Works of Corning, N.Y., having low thermal conductivity and low specific heat.

Not only does the cap 18 cover the end surface of the support assembly 16, but it also extends for a short distance along the cylindrical sides of the support assembly 16. The thin metal cap 18 thus not only contributes significantly to the rapid response of the thin-film resistance thermometer 36 to the temperature of the surface being measured, but by virtue of the extension of the metal cap 18 along the cylindrical side of the support assembly 16, the total heat transfer coefficient from the surface being measured remains constant with the cap 18 in contact with the surface or with the cap removed. The total heat transfer from the surface remains constant because the heat flow from the cylindrical surface of the cap 18 is matched to the heat flow from the area of the surface being measured that is covered by the circular area of the cap 18. It will be recognized that when the probe 10 is to be used to measure the temperature of a surface of metal or other material having high thermal conductivity, that the cap 18 should extend along the cylindrical sides of the support assembly 16 a distance such that the circular area of the cap 18 in contact with the surface to be measured is equal to the cylindrical area of the sides of the cap 18. With this arrangement, the heat loss from the surface contacted by the cap 18 will remain essentially constant whether the cap 18 is pressed against the surface or removed. This condition is more readily accomplished if the support assembly 16 is made of a material having a thermal conductivity at least 200 times lower than the thermal conductivity of the material of the cap 18. Under such conditions the heat loss from the support assembly 16 is sufficiently small that it can be ignored.

The support assembly 16 as shown in FIG. 3 includes a pair of axial passages 42 from the recessed chamber 34 to a potting hole 44 through which a pair of fine leads 46,46 from the resistance thermometer 36 pass to the potting hole 44. In the potting hole 44 the fine leads 46,46 from the thin film resistance thermometer 36 are welded to a pair of heavier leads 48,48. The leads 46,46 and the leads 48,48 are maintained in place by filling the potting hole 44 with a suitable cement 66 such as a phosphate bonded alumina high temperature cement. The leads 48,48 then pass through a pair of axial passages 50 to a second potting hole 52. Within the second potting hole 52 the electrical leads 48 are welded to heavier leads preferably of copper for connection to a measuring instrument, not shown. As is common practice in the use of precision resistance thermometers, a three-lead arrangement is shown with copper leads 54,54 welded to one of the leads 48 and a copper lead 56 welded to the other of the leads 48. The leads 54,54 and 56 pass through a passageway 68 through the proximal end of the sensor support assembly 16. In a preferred embodiment of the probe 10, an insulating ceramic spacer 70 was included to provide electrical insulation between the welded connections in the second potting hole 52. The second potting hole 52 and the connecting passageway 68 is filled with a suitable cement 72 which may be EC 2662 sold by the Emerson & Cumming Company.

FIG. 4 is a sectional end view showing the location of the resistance thermometer 36 in the recessed chamber 34 and the physical arrangement of the fine leads 46,46 and the passages 42,42.

Figure 5:
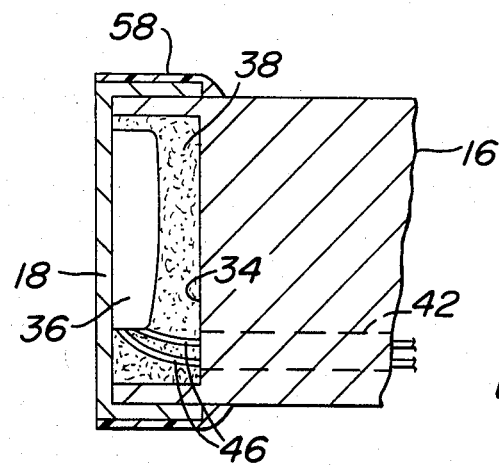
FIG. 5 is another embodiment of the measuring end of the probe.

As discussed above, the cap 18 extends along the cylindrical sides of the support assembly 16 in order to maintain the total heat loss transfer coefficient from the measured surface constant whether or not the cap 18 of the probe 10 is placed against the surface. When the surface to be measured is not a surface having high thermal conductivity, then the total heat transfer coefficient cannot be matched by utilizing a cylindrical area of the cap 18 equal to the end area of the cap 18, but the cylindrical area must necessarily be smaller due to the high thermal conductivity of the copper cap 18. It is possible to match the total heat transfer coefficient either by extending the cap 18 along the cylindrical surface of the support assembly 16 a shorter distance or, alternatively, as shown in FIG. 5, the cylindrical walls of the cap 18 may be covered with a thermal insulating material 58 to reduce the heat transfer coefficient so that it will be essentially the same as the total heat transfer coefficient from the surface whose temperature is to be measured.

In order to rapidly and accurately measure the temperature of a surface, it is important that the thermal resistance between the metal cap 18 and the surface be small. To achieve this, the cap 18 must be pressed firmly against the surface whose temperature is to be measured. To insure that the proper force is exerted, the compression spring 30 is provided. In use, the end cap 18 of the probe 10 is placed against the surface whose temperature is to be measured and sufficient force applied to the handle section 12, either directly or through the handle extension 14, to cause the compression spring 30 to be compressed. In a preferred embodiment, when the compression spring 30 is compressed, the pressure between the end cap 18 and the surface is approximately 150Kg/$M^2$ which is sufficient to reduce the thermal resistance to a satisfactory small value. In those instances where a pressure of 150Kg/$M^2$ cannot or may not be used, a thermal conducting paste may be introduced between the cap 18 and the surface being measured.

When the support assembly 16 is telescopically moved with respect to the cylindrical body section 20 of the handle 12 by a force applied to the handle 12 sufficient to compress the spring 30, it is desirable that there be no relative rotation between the cylindrical body section 20 and the support assembly 16 to avoid failure due to breakage of the electrical leads 54,54 and 56. In order to insure that no rotation takes place between the support assembly 16 and the cylindrical body section 20, the support assembly 16 is provided with an axial groove 60 which cooperates with a pin 62 located in the sidewall of the cylindrical body section 20 of the handle 12. This pin 62, in cooperation with the groove 60, allows translational movement of the support assembly 16 relative to the cylindrical body section 20 while preventing any rotational movement.

Figure 6:
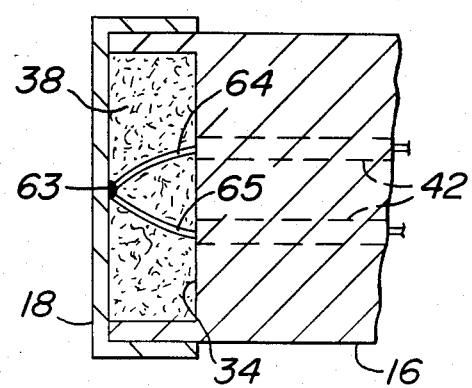
FIG. 6 is a further embodiment of the measuring end of the probe.

While the description of the probe 10 has indicated that the temperature sensing element is a thin film resistance thermometer 36, it is to be understood that other electrical temperature sensing detectors may be used provided they have low heat capacity. An alternative embodiment is shown in FIG. 6 in which a thermocouple 63, formed by the junction of a fine wire 64 and a fine wire 65 of composition differing from the fine wire 64, is located in the recessed chamber 34 with its measuring junction 63 in intimate thermal contact with the metallic end cap 18. It is, of course, important that the relationship set forth above with respect to the area of the end cap 18 in contact with the surface to be measured and the cylindrical walls of the end cap 18 be observed. While the general features of construction described with respect to the probe 10 using a resistance thermometer 36 will be the same when the thermocouple 63 is used, it is to be understood that the probe may be constructed using a smaller circular area of the cap 18 resulting in a shorter measurement time.

It is to be understood that the following claims are intended to claim all of the generic and specific features herein described.

What is claimed is:

1. An improved surface temperature measuring probe comprising:
   a support assembly having a body portion, a recessed chamber in one end thereof, and at least one passageway extending through said body portion;
   an electrical temperature sensing element housed in said recessed chamber;
   electrical signal leads connected to said electrical temperature sensing element and passing through said passageway;
   a thin cap in intimate thermal contact with said electrical temperature sensing element closing said recessed chamber in said end and extending up the sidewall of said support assembly for a short distance exposing said thin cap to ambient conditions, said thin cap having a thermal conductivity substantially greater than the thermal conductivity of said support assembly and having an end surface area that is equal to the surface area of the portion extending up the sidewall;
   handle means telescopically holding said support assembly; and
   spring means connected between said handle means and said support assembly whereby forces applied to said handle means are transmitted through said spring means to said support assembly.

2. Apparatus as claimed in claim 1 in which said support assembly includes at least one potting hole and a pair of passageways extending axially of said cylindrical shape with said electrical signal leads from said electrical temperature sensing element passing individually through said passageways, and
   electrical conductors joined to said electrical signal leads in one of said potting holes.

3. Apparatus as claimed in claim 1 in which said electrical temperature sensing element is a thin-film platinum resistance thermometer and said electrical signal leads are fine platinum wires.

4. Apparatus as claimed in claim 1 in which said thin high thermal conductivity cap is made of a material that is deformable to provide for low thermal contact resistance with the surface whose temperature is to be measured.

5. Apparatus as claimed in claim 4 in which said thin high thermal conductivity cap is pure copper.

6. Apparatus as claimed in claim 5 in which said cylindrical support assembly includes
   a portion having an enlarged diameter at the other end of said body portion;
   said handle means includes a cylindrical cavity of diameter slightly greater than the diameter of said other end of said support assembly;
   a first end wall closing a first end of said cavity and having an opening therethrough slightly larger than the diameter of the body portion of said support assembly;
   a second end wall closing said second end of said cavity, and
   said spring means constitutes a compression spring located between said other end of said body portion and said second end wall of said cavity whereby said support assembly is biased by said spring so that said portion of enlarged diameter engages said first end wall of said handle means.

7. Apparatus as claimed in claim 6 additionally including means for preventing rotation of said support assembly relative to said handle means when said spring means is compressed.

8. Apparatus as claimed in claim 1 wherein the thermal conductivity of said cap is at least two hundred times greater than the thermal conductivity of said support assembly.

9. An improved high speed surface temperature measuring probe comprising:
   a cylindrically shaped solid support member constructed of material having a low specific heat and a low thermal conductivity;
   a first portion of said support member having a first diameter and the remaining portion of said support assembly having a second diameter larger than said first diameter;
   a recessed chamber in the end of said first portion of said support member;
   a radially extending potting hole located in said first portion of said support member;
   a second radially extending potting hole located in said remaining portion of said support member;
   a pair of first passageways extending axially of said support member from said recessed chamber to said first potting hole;
   a pair of second passageways extending axially of said support member between said first potting hole and said second potting hole;
   a third passageway extending axially of said support member from said second potting hole to the end of said support member remote from said recessed chamber;
   a thin-film platinum resistance thermometer located in said recessed chamber with the face of said thermometer in the plane of the end of said support member;
   potting compound located in said recessed chamber for securing said resistance thermometer in said recessed chamber;
   a pair of fine platinum leads for said platinum resistance thermometer each lead extending through one of said pair of first passageways to said first potting hole;
   a pair of platinum wires connected to said platinum leads within said first potting hole and each wire extending through one of said passageways to said second potting hole;
   copper leads attached to said platinum wires in said second potting hole and extending through said third passageway;
   a thin copper cap covering the end of said support member in thermal contact with said face of said resistance thermometer and extending along the side walls of said first portion of said support member to an extent such that the area of the copper cap covering the end of said support member is substantially equal to the area of said copper cap extending along the side walls of said first portion;
   handle means having a cylindrical cavity in the central portion thereof of diameter slightly greater than said second diameter of said support member;
   a first end of said handle means being closed by an end wall having a hole therethrough of diameter greater than said first diameter and less than said second diameter of said body member;
   a plug closing the other end of said cylindrical cavity, and compression spring means located between said plug and said end of said support member whereby when measuring the temperature of a surface said cap is placed against said surface and force applied to said handle to cause compression of said spring to ensure sufficient contact of said cap with said surface to reduce the contact resistance therebetween.

10. An improved surface temperature measuring probe comprising:
 a support assembly having a body portion, a recessed chamber in one end thereof, and at least one passageway extending through said body portion;
 an electrical temperature sensing element housed in recessed chamber;
 electrical signal leads connected to said electrical temperature sensing element and passing through said passageway;
 a thin cap in intimate thermal contact with said electrical temperature sensing element closing said recessed chamber in said end and extending up the sidewall of said support assembly for a short distance exposing said thin cap to ambient conditions, said thin cap having a thermal conductivity substantially greater than the thermal conductivity of said support assembly;
 handle means telescopically holding said support assembly;
 spring means connected between said handle means and said support assembly whereby forces applied to said handle means are transmitted through said spring means to said support assembly; and
 means for preventing rotation of said support assembly relative to said handle means when said spring means is compressed.

* * * * *